United States Patent [19]

Brockett et al.

[11] 3,940,275

[45] Feb. 24, 1976

[54] RECORD MATERIAL AND MARKING LIQUID

[75] Inventors: Bruce W. Brockett; Ralph L. Marzocco, both of Dayton; Fredrick D. Weaver, New Lebanon, all of Ohio

[73] Assignee: NCR Corporation, Dayton, Ohio

[22] Filed: July 5, 1973

[21] Appl. No.: 376,636

Related U.S. Application Data

[63] Continuation of Ser. No. 220,413, Jan. 24, 1973, abandoned, and a continuation-in-part of Ser. No. 111,667, Feb. 1, 1971, abandoned.

[52] U.S. Cl. .................... 106/19; 106/21; 106/22; 260/38; 260/42.21
[51] Int. Cl.² ......................................... C09D 11/00
[58] Field of Search ................ 106/14.5, 22, 21, 19; 117/36.2, 36.8; 260/38, 42.21; 427/150

[56] References Cited
UNITED STATES PATENTS

| | | | |
|---|---|---|---|
| 3,525,630 | 9/1970 | Phillips, Jr. | 106/22 X |
| 3,641,011 | 2/1972 | Lin et al. | 106/14.5 X |

*Primary Examiner*—Lorenzo B. Hayes
*Attorney, Agent, or Firm*—Robert J. Shafer; E. Frank McKinney

[57] ABSTRACT

A colorless marking liquid comprising a vehicle in which is dissolved at least two colorless reactants each exhibiting its own distinctive color on reaction with an acidic record material sensitizing substance, the liquid yielding an apparent blue hue on record material sensitized with an acidic material. The resulting blue print provides excellent reproduction capabilities when copied by xerographic processes.

3 Claims, No Drawings

RECORD MATERIAL AND MARKING LIQUID

This is a continuation application of U.S. patent application Ser. No. 220,413, filed Jan. 24, 1972, now abandoned, which is a continuation-in-part application of United States patent application Serial No. 111,667, filed Feb. 1, 1971 now abandoned.

This invention relates to a multicomponent normally colorless marking liquid. This marking liquid is reactive and produces distinctive marks on appropriately sensitized record material by absorbing some or substantially all of the visible spectrum between a wavelength of 400 to 500 millimicrons.

Various marking liquids are known in the art. For example U.S. Pat. No. 2,850,395 issued on Sept. 2, 1958, on the application of Barrett K. Green discloses a printing fluid containing crystal violet lactone and a red dye. More recently, U.S. Pat. No. 3,525,630 issued on Aug. 25, 1970, on the application of Paul S. Phillips, Jr. discloses a colorless marking liquid to give a black print.

Multicomponent normally colorless marking liquids now have been found which absorb some or substantially all of the visible spectrum between a wavelength of 400 to 500 millimicrons. The marking liquids of this invention produce distinctive blue marks on appropriately sensitized record material. The blue-appearing marks range in hue from deep-blue to a purple-blue, including a neutral- or steel-blue hue. The reproduction capabilities of these blue appearing marks are excellent when copied by xerographic processes.

Accordingly, it is an object of this invention to provide multicomponent normally colorless marking liquids.

Other objects, aspects and advantages of this invention will be apparent to one skilled in the art from the following disclosure and appended claims.

The colorless reactants employed in the mark forming liquids of this invention are at least two in number, each alone exhibiting a color on reaction with record material sensitized with an appropriate acidic material. The mark forming liquids comprise a liquid oil solvent and the colorless reactants dissolved therein in the amount of several percent, as required, so that, when color is developed from them by contact with acid-sensitized record material, a collective result of the mixture appears blue to the eye or to electromagnetic sensitive devices such as photoconductors and yet provide excellent copies when exposed to xerographic processes.

The mark forming liquids of this invention are comprised of the colorless reactants (1) crystal violet lactone, which is named 3,3-bis(4-dimethylaminophenyl)-6-dimethylaminophthalide, alone or in combination with benzoyl leuco methylene blue, which is named 3,7-bis(dimethylamino)-10-benzoyl phenothiazine, and (2) at least one of (a) 2'-anilino-6'-diethylamino-3'-methylfluoran, (b) 2'-methyl-6'-cyclohexylamino fluoran, (c) 3,3-bis(1-ethyl-2-methyl-indol-3-yl) phthalide, (d) 9-diethylaminospiro [1,2-H-benzo-(a)-xanthene-1,2,1'-phthalide], (e) 2'-chloro-6'-diethylamino-3'-methylfluoran, or (f) 3,3-bis(1-benzyl)-2-methyl-indol-3-yl)phthalide.

The amount of crystal violet lactone, hereinafter referred to as CVL, in the mark forming liquids of this invention ranges up to 2 weight percent. The amount of benzoyl leuco methylene blue, hereinafter referred to as BLMB, if present, in the mark forming liquid ranges up to 1.5 weight percent. The amount of the remaining colorless reactant of the mark forming liquids is less than the combined amounts of CVL and BLMB present. Generally, this amount ranges up to 1.5 weight percent of the mark forming liquid.

In a preferred embodiment of this invention, the mark forming liquid is encapsulated in microscopic capsules which are coated on base sheet record material. In close contact with the base sheet record material is a sensitized undersheet. The base sheet yields the marking liquid under pressure of writing against the sensitized undersheet in a pattern of droplets corresponding to the written matter, in accordance with the disclosure of such a capsule-bearing sheet in U.S. Pat. No. 2,712,507 which issued July 5, 1955, on the application of Barrett K. Green. U.S. Pat. No. 2,712,507 also discloses a preferred method of forming the capsules. Other preferred methods for preparing oil-containing microscopic capsules are disclosed in U.S. Pat. No. 2,800,457 which issued on July 23, 1957, on the application of Barrett K. Green and Lowell Schleicher and in U.S. Pat. No. 3,041,289, which issued on June 26, 1962, on the application of Bernard Katchem and Robert E. Miller.

The encapsulated droplets are released by the rupture of capsules in writing operations. The mark forming liquid compos the liquid droplets is transferred in the pattern of the data configuration to the top of the underlying sheet. The top of the underlying sheet is coated or impregnated with at least one material which is an acid reactant with respect to the color reactants of the mark forming liquid and produces color with any such component that is reactive therewith. Representative acidic coating materials are, on one hand, oil-insoluble minerals or inorganic particulate solid material, represented by kaolin, attapulgite, silica gel, zeolites, and the like, and, on the other hand, organic polymeric acidic materials, such as acid-reacting phenolic resins of oil-soluble characteristics. Such polymeric materials will be disclosed later on in the specification.

One of the chief features of this invention is the provision of a mark forming liquid having multiple components which will collectively make an apparent blue color through their combined absorption of incident white light components, especially in the 400 to 500 millimicron range. The resulting print has a blue hue and strong absorbance in the above wavelength range. The formation of such a print upon application of colorless basic chromogenic material to an acidic substrate by use of a chemically basic colorless liquid has heretofore been unattainable to achieve a blue with excellent xerographic reproduction capabilities.

The record member consists of a base sheet or web member either of fibrous construction, such as paper, or of continuous structure, such as films of organic polymer material, carrying the color reactant in an exposed state with respect to applied liquid. The acid reactant, when of particulate nature, is arranged in intimate juxtaposition to form an apparently unbroken liquid receptive surface, yet substantially each particle individually is available for contact with applied liquid. If the phenolic polymer acidic material is used, it can be applied to the record material as a solution coating with insoluble acidic particles dispersed therein, if desired. While the record member is adapted to receive any kind of liquid, whether colored or colorable, its special utility is its use with the novel oily liquid, which is normally colorless and carries colorless chromogenic reactants in liquid solution. All of the eligible particles are substantially insoluble in water; however, at least one kind of particle can be soluble in the oily ink, and at least one other kind of particle can be insoluble in the oily ink. The kind of chromogenic reactant materials of the novel liquid of this invention generally undergo an acid-base reaction with their paired kind of acid reactant where applied to a record member to produce a distinctively colored mark; however, at least one of the kinds of chromogenic reactant material cited as useful herein—namely, benzoyl leuco methylene blue—undergoes hydrolysis followed by an oxidation-reduction reaction when and where applied to its paired kind of particle on said member to produce its distinctive color. As the several chromogenic reactant materials are applied in a common solvent to the same areas, the collective color will be a blend of the individual hues in the colored state. While, in its simplest form, the invention can be carried out by the use of the provided colorless liquids in combination with acidic reactants, typified by powdered acid-reacting oil-soluble phenolic polymeric material and acid minerals alone or in combination, for which examples will be given, disparate kinds of reactants can be used for diverse properties, reactant or not, which can be desired in the record member. These diverse properties may be physical or chemical.

Color-reactant recording systems are so called because the reactant chromogenic material content of the liquid used in such systems is substantially colorless and assumes a color when applied to a specially-sensitized recording surface, either coloring at once or finally yielding color on prolonged contact with the associated acidic material. The sheet, even though sensitized, can be printed on at one time or in one area with conventional colored printing inks and at another time in another area on the sheet with the novel colorless liquid.

As distinguished from pigment liquids, the chromogenic material in the novel colorless liquid of this invention is a combination of colorless reactants that assume, through chemical reaction, a visually collective distinctive color when undergoing reaction with the acidic reactants on the sheet.

For most recording purposes, it is essential from a commercial standpoint that a distinctive color make prompt appearance on the application of the colorless reactant to the recording surface, to produce a visible representation of whatever is meant to be recorded; that the color be of distinctive hue and also of high intensity; and that the mark remain colored for a long period of time consistent with the objective of permanent recording. Colored dyes have well-known infirmities as regards permanence, such infirmities relating to light-fading, thermal fading, and molecular rearrangements and disintegrations of various kinds, in which part or all of the visually perceptible color is lost.

Polymeric materials of sufficient activity in an acid sense and suitable for use in this invention because they are oil-soluble are disclosed in a continuation application for U.S. Letters Patent, Ser. No. 744,601, filed June 17, 1968, based on application for U.S. Pat. No. 392,404, filed Aug. 27, 1964, by Robert E. Miller and Paul S. Phillips, Jr.

Among the oil-soluble organic polymeric materials suitable for use in this invention together with appropriate solvents to be used therewith, acid-reaction phenol-aldehyde and phenol-acetylene polymers, maleic acid-rosin resins partially or wholly hydrolyzed styrene-maleic anhydride copolymers and ethylene-maleic anhydride copolymers, carboxy polymethylene (Carbopol 934), and wholly or partially hydrolyzed vinyl methyl ether-maleic anhydride copolymer are specified as typical of the reactive acidic polymeric materials.

Among the phenol-aldehyde polymers found useful are members of the type commonly referred to a novolaks, which are characterized by solubility in common organic solvents and which are, in the absence of cross-linking agents, permanently fusible. Another group of useful phenol polymeric materials are alkylphenol-acetylene resins, likewise soluble in common organic solvents and possessing permanent fusibility in the absence of being treated by cross-linking materials. Generally, the phenolic polymer materials useful in practicing this invention are characterized by the presence of free hydroxyl groups and by the absence of groups, such as methylol, which tend to promote infusibility or cross-linking of the polymer, and by their solubility in organic solvents and relative insolubility in aqueous media.

A laboratory method useful in the selection of suitable phenolic resins is a determination of the infrared radiation absorption pattern of a candidate material. It has been found that phenolic resins showing an absorption in the 3200–3500 $cm^{-1}$ region (which is indicative of the free hydroxyl groups) and not having an absorption in the 1600–1700 $cm^{-1}$ region are suitable. The latter absorption region is indicative of the desensitization of the hydroxyl groups and consequently makes such groups unavailable for reaction with the chromogenic material to be specified.

The preparation of the phenolic-formaldehyde polymeric materials suitable for practicing this invention is described in "Industrial and Engineering Chemistry," volume 43, pages 134 to 141, January, 1951; a particular polymer thereof is described in Example I of U.S. Pat. No. 2,052,093, which issued on Aug. 25, 1936, on the application of Herbert Honel; and the preparation of the phenol-acetylene polymers is described in "Industrial and Engineering Chemistry," volume 41, pages 73 to 77, January, 1949.

The preparation of the maleic anhydride copolymers is described in the literature, such as, for example, one of the maleic anhydride-vinyl copolymers, as disclosed in the publication "Vinyl and Related Polymers," by Calvin E. Schildknecht second printing, published April, 1959, by John Wiley & Sons, Incorporated. See pages 65 to 68 (styrene-maleic anhydride copolymer), pages 628 to 630 (vinyl methyl ether-maleic anhydride copolymer), and pages 530 and 531 (ethylene-maleic anhydride copolymer).

The liquid solvent portion of the mark forming liquid is capable of dissolving the mark forming chromogenic components. The solvent can be volatile or nonvolatile, and a single or multiple component solvent which is wholly or partially volatile can be used. Examples of volatile solvents useful with the basic chromogen and acidic polymer mark forming components specified are toluene, petroleum distillate, perchloroethylene, and xylene. Examples of nonvolatile solvents are high-boiling-point petroleum fractions and chlorinated diphenyls.

Generally, the solvent forming the vehicle to a large extent should be chosen so as to be capable of dissolving at least 1%, on a weight basis, of the basic chromogenic material, preferably in excess of 2%, and a larger amount of polymeric material—up to, say, 15% or more—to form an efficient reaction. However, in the preferred system, the solvent should be capable of dissolving an excess of the polymeric material, so as to provide every opportunity for maximum reaction utilization of the chromogenic material and thus to assure the maximum coloration at a reaction site.

A further criterion of the selected solvent is that it must not interfere with the mark forming reaction. In some instances, the presence of the solvent may interfere with the mark forming reaction or diminish the intensity of the mark, in which case the solvent chosen should be sufficiently vaporizable to assure its leaving the reaction site after having, through solution, brought the mark forming components into intimate admixture, so that the mark forming reaction proceeds.

In the base-acid color system, as stated above, the polymeric mark forming component(s) chosen must be acidic relative to the basic chromogenic compound and reactive with the chromogenic material to effect the distinctive color formation of color change.

Kaolin is generally known and used in the papermaking industry as "china clay" and is outstandingly preferable as a particulate oil-insoluble and water-insoluble mineral material of acid characteristics necessary to color benzoyl leuco methylene blue, one of the chromogenic components, where that component is necessary. A white kaolin is used, and, because of its whiteness, its plate-like particle form, which gives it unparalleled coating properties in aqueous slurries, its universal abundance in supply, its historical general usage in the papermaking and paper converting industries, and its low cost, it is an ideal material. Other types of particulate and substantially colorless water- and oil-insoluble minerals of the necessary acid properties are deemed equivalents of kaolin, some being bentonites.

Attapulgite can be used in this invention as an efficient colorless mineral reactant material to color those colorless chromogenic compounds of the novel liquid of this invention that react on contact in an electron-donor-acceptor reaction, and, by reason of its high oil absorbency, is doubly useful as an absorbent reactant coating on paper to form color with such chromogenic compounds dissolved in oil as may be applied to it.

From the foregoing choice of materials, a number of different specific compositions on a dry basis may be made, and these may then be used as desired, as being made into an aqueous slurry to be coated on a finished paper sheet, to be applied to a wet sheet of paper in the formative state in any desired manner, or made a part of the paper furnish from which a paper sheet is made, or on the other hand applied as a dispersion coating to a continuous film-like web such a synthetic organic polymeric material made into record sheets, bands, or strips, or to any record support material surface, all coming within certain limits merely set as practical and not set for any chemical or physical reason. In general, so as to be economical, the materials should be used in just sufficient quantities to make useful records for the purpose in view, and this relates to criteria of the factors of intensity, definition, color and a great many other factors with regard to the characteristics of the base web material, the characteristics of the colorless reactants to be applied, and the environment of use, all of which come within the paper manufacturers' and printers' skill and general knowledge and are not deemed to be of inventive concept. Generally, but not as a limitation in any sense, an aqueous dispersion of the particulate materials could well be from 40% to 75% water, by weight, and the remainder from 60% down to 25% of the particulate reactants divided generally on a basis of five parts, by weight, of the oil-insoluble component to one part, by weight, of the oil-soluble component, as a guide, but not as a limitation. Amounts of papercoating adhesive binders are added as is necessary to cause the particles to adhere to the base web to which they are applied, but, of course, adhesives that have a tendency to mask the particles physically or to chemically deactivate the particles should not be used, nor should any material be used as an adhesive in great excess of actual requirements, all of such factors tending to decrease the efficient use of the associated active particles because of a limitation of the exposed surface area. Binders of particular use herein may be chosen from among papercoating latexes such as styrene-butadiene and acrylic latexes. Here again, the paper makers' and printers' skill and judgment should govern.

Where the particles of Kaolin and acid polymeric material are slightly delayed in responsiveness because of their physical situation or condition in the support sheet, an amount of silica gel up to equal the amount of acid polymeric material may be used for its beneficial effect in the characteristics stated, but such use is not necessary to the practice of the invention in its simplest form. Silica gel is insoluble in oil but is absorbent thereof, may be finely ground, is colorless, disperses readily in water, and may be treated to increase its porosity and effectiveness as an acid.

The particle size of the reactants preferably should be from one to three microns in largest dimension, although considerable latitude at the expense of efficiency and economy is tolerable. For instance, if the grinding of materials to the most effective size is too expensive, their larger particle sizes are tolerable as long as sufficient color reaction per unit area of the record material is provided.

One of the chief considerations in selecting a preferred embodiment of the invention must be concerned with the manufacture of the record sheet, and, as of now, the best way to sensitize a sheet is to apply an aqueous slurry of the novel composition to a finished web of paper as it passes a coating station in a papermaking machine. Such a coating composition contains binder material and may contain defoamers and dispersing agents common to papercoating practices, but their specification in no way is to mean a limitation of the practice of the invention in regard to either choice or necessity.

The advantages of this invention are further illustrated by the following examples. The reactants and the proportions and other specific conditions are presented as being typical and should not be construed to limit the invention unduly.

EXAMPLE I

A homogeneous solution of 1.5 weight percent crystal violet lactone and 0.9 weight percent of 2'-methyl-6'-cyclohexylaminofluoran dissolved in an oil comprising a two-to-one mixture of chlorinated biphenyl and saturated hydrocarbon, by weight was prepared. This solution resulted in a neutral or steel blue hue on sensitized record material.

EXAMPLE II

Two additional solutions were prepared according to Example I except that the 0.9 weight percent of 2'-methyl-6'-cyclohexyl-aminofluoran was replaced with 0.9 weight percent of 9-diethylaminospiro [1,2-H-benzo-(a)-xanthene-12,1'-phthalide] and 3,3-bis(1-ethyl-2-methyl-indol-3-yl) phthalide, respectively. These solutions each resulted in a purple-blue hue on sensitized record material.

EXAMPLE III

Another solution was prepared according to Example I, which served as a control run. In this solution, the 0.9 weight percent 2'-methyl-6'-cyclohexylaminofluoran was replaced with 0.9 weight percent benzoyl leuco methylene blue. This solution resulted in a steel blue hue on sensitized record material.

EXAMPLE IV

A homegeneous solution of 1.7 weight percent crystal violet lactone and 1.1 weight percent 2'-anilino-6'-diethylamino-3'-methylfluoran dissolved in an oil comprising 64.8 weight percent monoisopropyl biphenyl and 32.4 weight percent of saturated hydrocarbon was prepared. Note, all weight percents are based on the total weight of the solution. This solution resulted in a neutral or steel blue hue on sensitized record material.

EXAMPLE V

Another solution was prepared according to Example IV except that the 1.1 weight percent of 2'-anilino-6'-diethylamino-3'-methylfluoran was replaced with a mixture of 0.55 weight percent 3,3-bis(1-ethyl-2-methyl-indol-3-yl)phthalide and 0.55 weight percent 3,3-bis(1-benzyl-2-methyl-indol-3-yl)phthalide. The solution resulted in a purple-blue hue.

EXAMPLE VI

A homogeneous solution of 1.5 weight percent crystal violet lactone, 1.25 weight percent benzoyl leuco methylene blue and 0.5 weight percent 2'-chloro-6'-diethylamino-3'-methylfluoran dissolved in an oil comprising a two-to-one mixture of chlorinated biphenyl and saturated hydrocarbon, by weight was prepared. The solution resulted in a purple-blue hue on sensitized record material.

EXAMPLE VII

The colorless marking solutions prepared in Examples I to VI were encapsulated according to the following procedure.

Two hundred grams of any of these solutions was emulsified into 130 grams of an 11 percent, by weight, solution of pigskin gelatin in water and an additional quantity of water having a weight of 71 grams. The foregoing emulsion had a pH of 6.5 at 55° C. The gelatin sol contained 4 grams of Elcide 75 per 996 grams of 11 percent gelatin.

Coacervation was accomplished by admixing 500 grams of the above emulsion, 10.5 grams of 5 percent solution of polyvinylmethylether maleic anhydride copolymer and 87 grams of 11 weight percent of gum arabic in water and an additional 590 grams of water at about 70° C. The resulting mixture is maintained at 55° C. with moderate, continuous agitation. The pH of the mixture was adjusted to 9 with 20 percent sodium hydroxide. Then, slowly at first, add 13 ml of 14 percent acetic acid in a dropwise manner. Droplets of the internal phase of ink so produced had deposited thereon a liquid capsular wall consisting of a complex of gelatin, gum arabic, and polyvinylmethylether maleic anhydride copolymer, in a dense state, said deposit of material around the oil droplets having been caused by coacervate forces.

The capsules then formed were solidified by cooling to a temperature of about 10° C., while being continuously agitated. When the capsules were thus chilled, and when their walls were thus solidified, there was added 7.5 ml of a 25 percent, by weight, aqueous solution of glutaraldehyde. The effect of the glutaraldehyde upon the walls of polymer materials was to harden and insolubilize them. After one hour, an additional quantity of 15 ml of a 5 percent, by weight, aqueous solution of polyvinylmethylether maleic anhydride copolymer was added to prevent agglomeration of the capsules. The pH was then slowly adjusted to about 10 by the dropwise addition of 20 percent sodium hydroxide. The capsules could then be treated as solids dispersed in a residual aqueous medium, or they could be dried and treated as minute solid units.

EXAMPLE VIII

Prints were made on various sensitized sheets with the capsules produced in Example VI according to the procedures previously described. Tables I and II consist of the reflective intensities obtained using the Siemens Densiometer on the character I of a xerographic copy obtained from Xerox Model 2400 on each of the prints.

On each of the four different types of sensitized record material, the mark forming liquids of this invention provided xerographic copies which showed improved results over the control blue hue, i.e., increased reflectance. The control blue was a mixture of crystal violet lactone and benzoyl leuco methylene blue. Xerographic copies of a blue print are provided while still maintaining a blue hue in the original print.

TABLE I

| | Silon | 8-20 Resin* | Paraphenyl-phenol | Att-tapu-ulgite |
|---|---|---|---|---|
| Crystal Violet Lactrone and 2'-methyl-6'-cyclohexylaminofluoran | 35.2 | 21.1 | 39.9 | 27.8 |
| Crystal Violet Lactone and 9-diethylaminospiro [1,2-H-benzo-(a)-xanthene-12,1'-phthalide] | 34.6 | 18.1 | 39.7 | 24.6 |
| Crystal Violet Lactone and 3,3-bis(1-ethyl-2-methyl-indolyl-3-yl) phthalide | 34.1 | 19.3 | 31.6 | 29.1 |
| Crystal Violet Lactone and benzoyl leuco | | | | |

TABLE I-continued

|  | Silon | 8-20 Resin* | Paraphenyl-phenol | Att-tapu-ulgi-te |
|---|---|---|---|---|
| methylene blue (control) | 19.6 | 9.2 | 13.8 | 14.7 |

*80 parts by weight para-tertiary-butylphenol, and 20 parts by weight para-chlorophenol

TABLE II

|  | 80-20 Resin* | Para-phenylphenol |
|---|---|---|
| Crystal Violet Lactone and benzoyl leuco methylene blue | 18.1 | 27.4 |
| Crystal Violet Lactone and 2'-anilino-6'-diethylamino-3'-methylfluoran | 45.7 | 50.1 |

*80 parts by weight para-tertiary-butylphenol, and 20 parts by weight para-chlorophenol

EXAMPLE IX

A homogeneous solution of 1.7 weight percent crystal violet lactone, 0.55 weight percent 2'-anilino-6'-diethylamino-3'-methylfluoran and 0.55 weight percent 3,3-bis(1-ethyl-2-methyl-indol-3-yl)phthalide dissolved in an oil comprising 64.8 weight percent monoisopropyl biphenyl and 32.4 weight percent of saturated hydrocarbon was prepared. All weight percents were based upon the total weight of the solution. The solution resulted in a neutral or steel blue print on sensitized record material. These blue prints provided excellent xerographic copies on a Xerox Model 2400.

EXAMPLE X

Another solution was prepared according to Example IX except that 0.50 weight percent benzoyl leuco methylene blue was employed in addition to the three colorless reactants of Example IX. The solution resulted in a neutral or steel blue print on sensitized record material. These blue prints provided excellent xerographic copies on a Xerox Model 2400.

Although this invention has been described in considerable detail, it must be understood that such detail is for the purposes of illustration only and that many variations and modifications can be made by one skilled in the art without departing from the scope and spirit thereof.

What is claimed is:

1. In a substantially colorless but colorable marking liquid composition consisting essentially of an organic oil solution of a colorless reactant; the improvement comprising, as said reactant, (1) 1.7 to 2 weight percent of 3,3-bis(4-dimethylaminophenyl)-6-dimethylaminophthalide; (2) 0.0 to 1.5 weight percent of 3,7-bis(dimethylamino)-10-benzoyl phenothiazine; (3) 1.1 to 1.5 weight percent of a mixture of 2'-anilino-6'-diethylamino-3'-methylfluoran and 3,3-bis(1-ethyl-2-methylindol-3-yl)phthalide or 1.1 weight percent 2'anilino-6'-dielhylamino-3'-methylfluoran wherein a ratio, by weight, of component (3) to components (1) and (2) is less than 1 to 1 and wherein the combination of components, when colored, yields an apparent blue-colored mark which absorbs substantially all of the visible spectrum between 400 and 500 millimicrons.

2. The marking liquid composition of claim 1 wherein component (3) is substantially equal amounts of 2'-anilino-6'-diethylamino-3'-methylfluoran and 3,3-bis(1-ethyl-2-methylindol-3-yl)phthalide.

3. The marking liquid composition of claim 2 wherein the fluoran and the phthalide of component (3) are each present in about 0.55 weight percent.

* * * * *